United States Patent [19]

Johnson

[11] Patent Number: 4,579,044

[45] Date of Patent: Apr. 1, 1986

[54] TWO-SPEED SHIFT VALVE

[75] Inventor: David E. Johnson, Wagoner County, Okla.

[73] Assignee: PACCAR Inc, Bellevue, Wash.

[21] Appl. No.: 594,226

[22] Filed: Mar. 28, 1984

[51] Int. Cl.$^4$ .......................... B66D 1/24; F15B 11/20
[52] U.S. Cl. ........................................ 91/519; 60/425; 60/427; 91/436; 91/420; 137/101; 137/599.2; 137/529; 254/340
[58] Field of Search ..................... 60/425, 427; 91/519, 91/532, 436, 420; 137/101, 114, 599.2, 529

[56] References Cited

U.S. PATENT DOCUMENTS

| | | | |
|---|---|---|---|
| 2,616,259 | 11/1952 | Quintilian | 60/425 |
| 2,618,291 | 11/1952 | Vestre | 60/427 |
| 3,626,975 | 12/1971 | Bobst | 137/529 |
| 3,765,181 | 10/1973 | Lang et al. | 60/425 |
| 3,768,263 | 10/1973 | Olson et al. | 60/425 |
| 4,142,369 | 3/1979 | Mickelson | 60/425 |
| 4,338,856 | 7/1982 | Smilges et al. | 91/420 |
| 4,404,891 | 9/1983 | Turnquist et al. | 91/420 |
| 4,501,291 | 2/1985 | Siegrist | 137/529 |

*Primary Examiner*—Robert E. Garrett
*Assistant Examiner*—Richard S. Meyer
*Attorney, Agent, or Firm*—Seed and Berry

[57] ABSTRACT

A two-speed, pilot-operated selector valve which directs hydraulic fluid to two motor elements with a common output shaft to obtain a high-torque, low-speed mode, or to one motor element, while recirculating the second element in a loop, to obtain a low-torque, high-speed mode. The spool has a built-in logic mechanism which, while shifting from one position to the other, prevents any momentary condition where a motor discharge port is blocked or a fluid path exists that bypasses both motor elements.

7 Claims, 4 Drawing Figures

TWO-SPEED SHIFT VALVE

TECHNICAL FIELD

This invention pertains to a two-speed hydraulic motor shift valve for a winch or other apparatus subject to overrunning loads. The valve spool has an integral logic mechanism. During spool shift, this mechanism prevents a direct flow path from existing around the motor, which would allow a free-fall condition in a winch. It also prevents a blocked motor outlet from existing, which would abruptly stop the motor and create a momentary excessive-pressure condition. This valve has the advantage that the logic portion of the spool is isolated when the spool is at either extreme position, thus eliminating the logic mechanism from steady-state leakage and failure-mode considerations.

BACKGROUND ART

Many winch applications have a need for two-speed operation to maximize the efficiency of the winch on a crane or other application. This is because much of a crane's time is spent moving light loads, which requires a small fraction of the winch system capacity. A single-speed winch circuit requires that the prime mover (engine) be sized to handle the peak horsepower requirements of the heavy loads. This results in a system which is used only to partial capacity much of the time. This is wasteful of the operator's time and system horsepower.

A way of minimizing the inefficiencies described above is to provide a two-speed hydraulic motor for the winch, with some means of shifting speeds by directing oil (working fluid) to both motor elements, or one element only and recirculating the second element in a loop. This valving mechanism has the requirement that during valve spool transition from one extreme to the other, it neither blocks the outlet of a motor element, causing a blocked-flow condition, nor allows a cross-port flow path, which permits the total motor displacement to circulate from inlet to outlet ports in an unrestricted path. A momentary cross-port flow will cause the motor to be effectively in a momentary free-wheeling condition where it can neither provide torque to continue raising the load nor provide a braking action in which the motor tries to pump against a brake valve. Obviously, this condition is undesirable because it provides the potential for dropping the load some distance.

Currently, other valves available employ secondary logic spools and check valves which are separate from the main valve shift spool. This causes most designs to be unduly expensive and bulky.

DISCLOSURE OF INVENTION

It is the primary object of this invention to incorporate all of the above safety features into a single compact shift valve spool assembly.

The method of recirculating fluid through one or more of the motor elements, as described above, is not to be confused with the designs which block the inlet and discharge flow paths to a motor, causing it to operate in a partially cavitated condition for extended periods of time. Also, it should be obvious to a person sufficiently versed in hydraulic circuit design that the shift valve as described would have merit in a tractive drive, conveyor or any other application in which the potential exists for an overrunning load and unrestricted cross-port flow which allows the motor to recirculate flow, thus negating any hydraulic braking capability and permitting a momentary run-away condition.

BEST MODE FOR CARRYING OUT THE INVENTION

Figure 1:
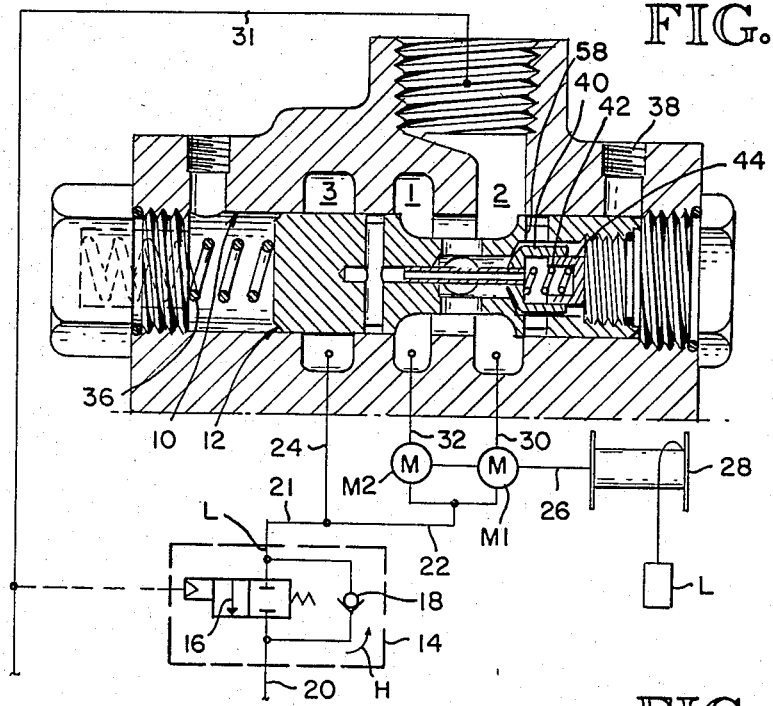
FIG. 1 is a schematic illustration of a brake valve, motor circuit, and unique two-speed shift valve embodying the principles of the invention.

A basic valve geometry is shown in FIG. 1. The main valve body consists of a spool bore 10 with three cores 1, 2, 3 spaced to provide a zero to underlapped valve spool timing with respect to adjacent cores 1 and 2 or 1 and 3. A valve spool 12 contains a number of logic circuit parts, which will be described in detail.

A conventional brake valve 14 or a brake valve of the type shown in U.S. Pat. No. 4,404,891, the details of which are incorporated herein by reference thereto, has a variable orifice 16 and a bypass check valve 18. Flow from a supply of pressurized hydraulic fluid enters the brake valve via line 20, exits via line 21, and then splits into a main line 22 and a loop line 24. Fluid in the main line 22 then passes to two positive-displacement motors or motor elements $M_1$ and $M_2$ fixed on a common shaft 26, which is coupled to the drum 28. The drum has a line which supports a load L.

Leaving motor $M_1$ is a line 30 that connects to core 2 in the valve body. The fluid discharges through a line 31, which returns to the hydraulic supply. Fluid leaving motor $M_2$ passes via line 32 to core 1 of the valve body. Finally, loop line 24 passes into core 3.

Figure 3:
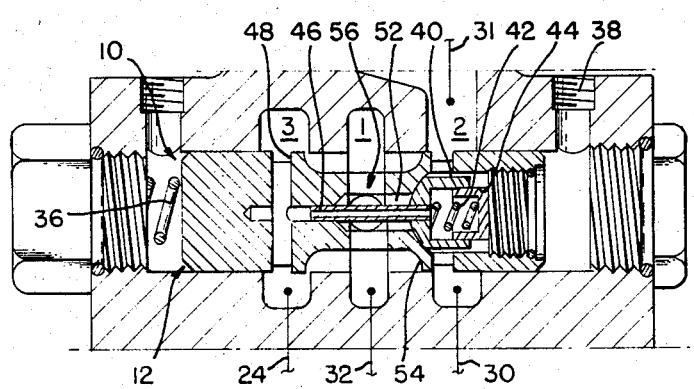
FIG. 3 is a third operational position of the two-speed shift valve shown in FIG. 1.
Figure 4:
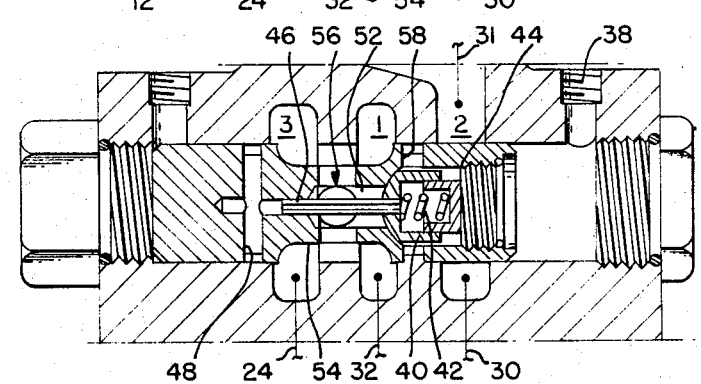
FIG. 4 is a further operational position of the two-speed shift valve shown in FIG. 1.

The valve spool 12 is positioned to the right, as shown in FIG. 1, by a spring 36, and is moved to the left by the introduction of pressure to the right of the spool through a port 38. The spool is normally operated as shown in FIG. 1 or to the far left, as shown in FIG. 4. The positions shown in FIGS. 2 and 3 are momentary, transient positions of the valve as it moves from the far right position of FIG. 1 to the far left position of FIG. 4.

Figure 2:
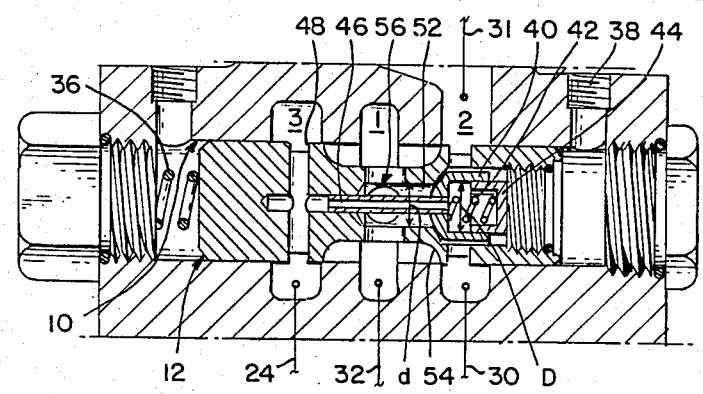
FIG. 2 is a second operational view of the two-speed shift valve shown in FIG. 1.

Referring to FIG. 2, the valve spool is provided with a check valve 40 held closed by a spring 42 that rests in a cap 44. The spring cavity of check valve 40 communicates through a passage 46 to a logic port 48 in the spool 12. The spool also has a central passage 52, which communicates with a spool recess 54 via an opening 56. As is readily understood, pressurized fluid within passage 46 will assist in keeping the check valve closed. Pressurized fluid in central passage 52 will tend to open the check valve against the pressure of the spring 42.

To understand how the valve operates and prevents an unrestricted flow path around both motor elements $M_1$ and $M_2$, and how it prevents the blocking of the flow out of motor element $M_2$, consideration is now given to the different valve spool operating positions and the related hydraulic conditions.

Case I

The valve spool 12 is in the farthest right extreme position, as shown in FIG. 1, with the recess 54 connecting cores 1 and 2 to allow hydraulic fluid to power both motor elements $M_1$ and $M_2$. In this condition, hydraulic fluid from the pump or other pressurized source travels through line 20, check valve 18, line 21, line 22, through motor elements $M_1$ and $M_2$, through line 30 and line 32 and connected cores 1 and 2, and finally exiting line 31 to return to the pump reservoir. This is the raising condition.

In the opposite, lowering condition, with the valve in the position of FIG. 1, fluid enters core 2 from the pump or other pressurized source via line 31, enters motor elements $M_1$ and $M_2$, and is discharged through lines 22 and 21 to brake valve 14, which controls the amount of fluid passing through line 20 and, therefore, the rate of descent of load L by varying the size of orifice 16 in response to pressure in line 31.

In another extreme position, with the valve spool completley to the left, as shown in FIG. 4, cores 1 and 3 are connected by the recess 54 to allow the motor shaft 26 to be operated by only motor element $M_1$, and fluid passing through motor element $M_2$ recirculates in a loop through line 32, recess 54, line 24, line 22, and back through motor element $M_2$. It should be noted that the valve body lands between ports 1 and 3 or 1 and 2 will block either of the spool logic ports 48 or 58 in the two extreme positions shown in FIG. 1 and FIG. 4. Furthermore, only one of the spool ports 48 or 58 centered over the casting land between cores 1, 3 or 1, 2 must be blocked to isolate the logic circuit. This effectively eliminates the logic portions of the spool from steady-state leakage or failure-mode considerations.

Case II

Assume the valve spool is in a transition condition, centered over core 1, as shown in FIG. 2. The spool outer diameter seals on the lands between cores 1, 3 and 1, 2. Now consider the oil flow path is from motor $M_1$ through core 2 and back to the reservoir. Motor element $M_2$ is blocked until check valve 40 opens, since line 32 communicates with core 1, which is blocked by the lands between cores 1, 2 and 1, 3. Motor element $M_1$, in this condition, is driving motor element $M_2$ as a pump, forcing oil into core 1, across the check valve 40, out through spool port 58, and into core 2. The check valve contains a closed and sealed chamber of diameter D that is slightly larger than the check valve seat diameter d. The check valve cavity communicates via the passage 46 with spool port 48 and core 3. Thus, the discharge flow from motor element $M_2$ is being restricted across check valve 40 and vented to core 2. Also, because the area of diameter D is somewhat larger than the check seat area of diameter d, the check valve is restricting the discharge flow of motor element $M_2$, causing the pressure in core 1 to be slightly higher than in core 3.

Now consider a second situation of Case II. The valve spool is in the same transition condition as shown in FIG. 2, except that the direction of flow is opposite, with oil entering the valve through line 31, as in the case where the winch is lowering a load. Again, motor element $M_1$ is driving element $M_2$ as a pump. Core 1 is acting as the pump inlet, and at this instance, is completely blocked, causing a momentary cavitation condition on the inlet of motor element $M_2$. Normally, this cavitation exists for only a fraction of a second, which is short enough to prevent any significant cavitation damage to element $M_2$. For example, the cavitation may exist for less than 5–10 milliseconds. During this instantaneous period, the oil will be sucked out of the core 1.

As soon as the valve spool moves beyond the instantaneous position of FIG. 2, however, the fluid in bypass line 24 will be available to cause again a closed circuit around and through $M_2$, and cavitation will cease. It should be noted that total valve spool shift from one extreme position, as shown in FIG. 1, to the other other extreme position, as shown in FIG. 4, takes place in less than one-half second.

Case III

The valve spool is in a transition condition, as shown in FIG. 3. In this instance, spool port 48 is connected with core 3 and passage 58 is connected to core 2. In one condition of this case, the oil flow path is from motor element $M_1$ through core 2 and back to the reservoir, as when the winch is raising a load. The flow from motor element $M_2$ is directed to core 1, through recess 54 to core 3, through lines 24 and 22, and back to the inlet side of motor elements $M_1$ and $M_2$. Since the pressure in core 1 and core 3 is about the same and acts simultaneously on the area of diameter D and the area of diameter d, valve 40 remains closed, thus blocking the 24, 3, 54, 1, 56, 52, 58, 2, 31 flow path, which would have allowed flow to bypass both motor elements.

In a second condition, the oil flow direction is from line 31 into core 2. In this condition, the load is being lowered and the winch brake valve is regulating the load such that the load-generated pressure in core 3 often exceeds the lowering pressure at core 2. The braking pressure in core 3, which is about the same as the pressure in core 1, is communicated through valve spool port 48 and passage 46, and acts on the area of diameter D, which is greater than the area of the check valve seat diameter d, causing the check valve to remain closed, blocking the flow path between 3, 1, 56, 52, 58, and 2, which would negate the hydraulic braking capability of the brake valve 14.

In the steady-state flow conditions when the spool has stabilized at either of its extreme left or right positions, leakage from the logic spool ports, passages and check valve does not affect steady-state motor leakage.

It should be further understood that while the invention has been described with respect to two motor elements, the principle is equally applicable to three or more motor elements by employing multiple shift valve assemblies.

I claim:
1. A selector valve and motor system for a multiple-speed hoist of the type having a drum capable of carrying a load, said drum being powered by at least two fluid motors coupled to a common shaft, comprising:
a valve body having a spool bore and at least first, second and third axially spaced fluid cores communicating with said spool bore;
said second core communicating with a fluid supply and with a first of said fluid motors;
a spool slidable axially within said spool bore, said spool having a recess for coupling any two adjacent fluid cores and sealing surfaces for blocking flow between said adjacent cores;
the first core being located between the second and third cores and communicating with a second of said motors;
the third core communicating with a loop bypass line for providing a loop flow path through the second motor to remove the second motor from the power input to the drum and enabling the first motor to be operated at an increased speed;

said spool having a check valve communicating with the second and first cores when the spool position is such as to otherwise isolate these cores from each other, and operable upon increased pressure from the output of the second motor when driven as a pump in a hoisting condition to open a restricted flow path through the spool from the first to the second core, but blocking flow between the second and first cores when in a lowering condition, said check valve having a first surface adapted to be contacted by fluid in the first core and a second surface adapted to be contacted by fluid in the third core.

2. The valve and motor system of claim 1, including a brake valve between the fluid supply and the motors wherein the system, when lowering a load, causes a pressure buildup between the motors and the brake valve to restrict downward movement of the load.

3. The system of claim 1, said spool having a pilot pressure passage communicating with the second surface of the check valve to maintain the valve in the closed position when lowering a load and when the opposite end of the pilot pressure passage communicates with the third core.

4. A selector valve comprising a valve body having an axial spool bore, first, second and third fluid cores spaced axially along the core and communicating therewith, said first fluid core being positioned between said second and third fluid cores, a spool slidably positioned in said spool bore, a fluid-pressure activated check valve in said spool and operable to communicate between the first and second cores, fluid passage means also operable to connect the third core with the check valve to exert a pressure on the check valve to close the check valve, wherein the check valve will restrict flow between the first and second cores until the fluid pressure in the first core exceeds the fluid pressure in the third core, at which time the check valve will be operable to vent the flow from the first core to the second core.

5. The valve of claim 4 wherein the check valve has a first surface contacted by fluid in the first core and an opposite second surface, wherein said valve spool includes an axial pilot passage which communicates with the third core and with the opposite second surface of the check valve, and wherein the fluid pressure transmitted through the axial pilot passage bypasses across the first core, which is located intermediate said second and third cores.

6. The valve of claim 4, said spool containing all of the fluid passages necessary to activate the check valve without additional external porting.

7. The valve of claim 4 wherein the spool has sealing surfaces, the cores have adjacent lands engaged by the spool-sealing surfaces for providing restriction of flow between the lands and sealing surfaces, and wherein any fluid leakage between cores during steady-state flow conditions is negligible.

* * * * *